Patented Dec. 12, 1922.

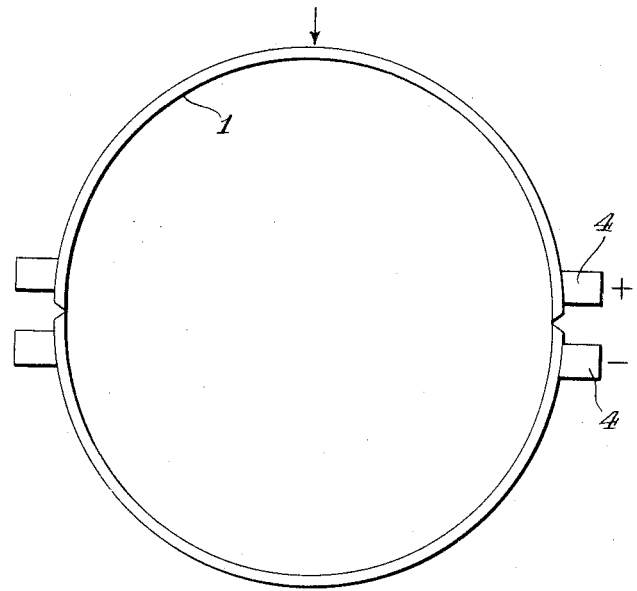
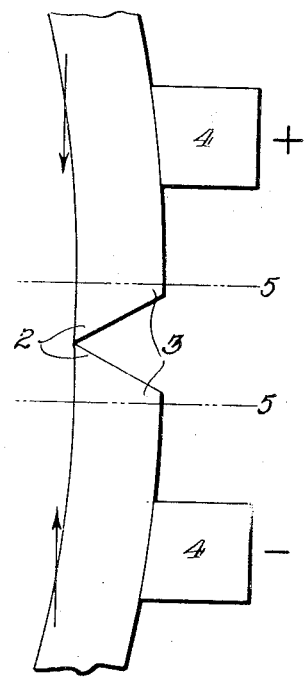
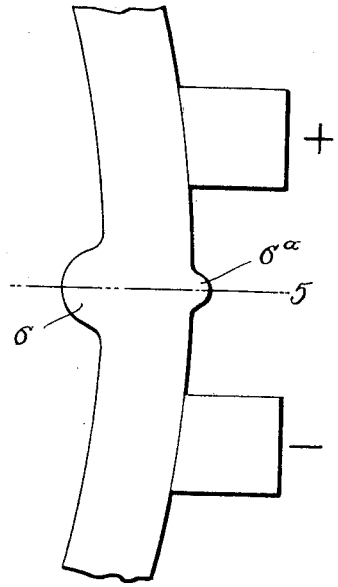
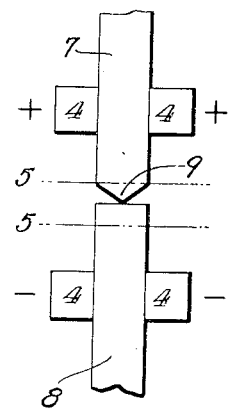

1,438,545

UNITED STATES PATENT OFFICE.

JOSEPH B. MURRAY AND THOMAS E. MURRAY, JR., OF BROOKLYN, NEW YORK.

ELECTRIC WELDING.

Application filed October 3, 1921. Serial No. 504,923.

*To all whom it may concern:*

Be it known that we, JOSEPH B. MURRAY and THOMAS E. MURRAY, Jr., citizens of the United States, and residents of Brooklyn, New York, have invented certain new and useful Improvements in Electric Welding, of which the following is a specification.

In a prior patent of Thomas E. Murray, Jr., No. 1,281,636, dated October 15th, 1918, there is described a method of welding metal parts together which consists in bringing them into contact and passing through the joint a current of very great amperage for a very short period of time, as for example for a fraction of a second.

In the application of said process, we have found that it is important to determine accurately the location of the electrodes through which the current passes to the parts to be welded together, that is to say, the distance of the electrodes from the edges of the pieces of metal being welded. The welding is accomplished by pressing the edges together. As the metal softens the parts are moved toward one another a slight distance, which we call the take-up, a part of the metal being extruded in this operation. The thickness of the metal has an influence on the quality of the weld. This is particularly important where the electrodes bear on the side faces of the metal, or on one such side face as is the practice in welding segments along their edges to form hollow objects. A heavy charge of current passes more quickly to the points along the width of the joint which are nearer to the electrodes. If the current and time interval are right for securing a good weld at the end nearest the electrodes, the weld will be less good at the remoter points. Or if the current and time be such as to secure a good weld at the remote points, there is apt to be a burning of the metal at the near points, which makes the weld less effective. For example, we have experimented with joints having three points of contact across the width thereof, with electrodes on the same face of the two sheets of metal, and have found that the metal at the contacts nearest the electrodes is burned, the intermediate contacts make a good weld, and the remote contacts makes so weak a weld as to crack even where the pressure used is so great as to cause an extrusion of the comparatively cold metal at this point.

It is apparent, therefore, that the comparative distances from the electrode to the near point of the joint and to the far point thereof play an important part in securing a good weld. As the electrode is moved nearer to the joint the difference between these two distances becomes greater, and as the electrode is moved back from the joint the difference becomes less.

On the other hand it has been found important in this method of welding to avoid dissipation of heat, in which case a greater length of time is required to secure a good weld. Again a very quick operation is necessary in order to avoid oxidation of the metal. For these considerations, therefore, it is advisable to place the electrode as near the joint as possible.

We have made numerous experiments and have found that these difficulties can be largely obviated, first, by determining the location of the electrodes by reference to the thickness of the joint, and second, by shaping the edges of the parts to be joined in such a way as to form the weld progressively across the width, starting with the point remote from the electrode.

The accompanying drawings illustrate diagrammatically the principles involved.

Fig. 1 is an end view of two semi-circular segments which are to be welded;

Fig. 2 is an enlarged detail of the same at one of the joints and Fig. 3 is a similar view after the welding operation;

Fig. 4 is an end view of two rods or flat plates being welded.

The segments 1 are formed up with their edges beveled so that the inner end 2 of the width of such edges is advanced beyond the outer end 3 thereof. An edge of this shape is naturally formed in bending up a flat sheet. Where such an edge is not naturally produced it may be produced by various machines or methods.

The electrodes 4 are brought into engagement with the outer faces of the segments 1 so as to be pressed toward each other while the segments are pressed together. The dotted lines 5, Fig. 2, indicate the extent of the metal which is to be taken up in forming the joint. That is to say, after the weld, the metal along the two lines 5 of Fig. 2 will be coincident as indicated in Fig. 3, the intermediate approximately wedge shaped portions of metal being softened and extruded to form a rib 6 on the inside of the joint, and a smaller rib 6ª on the outside.

As the parts are pressed together, the current being on, the weld will take place progressively across the width of the joint, from 2 to 3, and will be complete with a slight additional take-up after the opposite points 3 have come together. Thus the greater distance of the points 2 from the electrodes, and the consequent greater electrical resistance which the current encounters in passing through the metal to these points, as compared with the points 3, is compensated for by the fact that the points 2 come together an instant before the points 3. The whole operation requiring but a fraction of a second, it will be understood that the time intervals referred to are short. Nevertheless the beveled shape of the edges can be designed to compensate largely for the differences in distance from the electrodes.

The electrodes in the case illustrated are set back from the edges of the metal plates approximately a distance equal to the take-up plus the thickness of the metal, and this we have found, by experiment, to be a satisfactory distance for most cases. The electrodes could be advanced nearly to the lines 5 which mark the extent of the take-up, but this would make the difference in distance from the electrode of the points 2 and 3 respectively so great that it would be difficult to compensate for it adequately by the beveling of the edges of the sheets. On the other hand, we have found that if the electrodes be set back from the take-up lines 5 a distance greater than the thickness of the metal, there is a dissipation of heat and a loss of efficiency due to the quantity of metal heated between the electrode and the joint. In general, therefore, the rule should be to set the electrodes back from the edge somewhere between a maximum distance approximately equal to the take-up plus the thickness of the metal in the case of thick metal, or the take-up plus about twice the thickness in the case of thin metal, and a minimum distance equal to or slightly greater than the take-up, considering the extreme points of contact 2 as constituting the edge.

The progressive welding across the width of the joint, and also the location of the electrodes with reference to the edge, are of importance in welding other than hollow bodies, with electrodes applied to both sides of the metal pieces, though of less importance than in the first case. Fig. 4 for example shows two metal pieces 7 and 8 with their edges so shaped that as they are pressed together, contact takes place first at an intermediate point 9 and the weld is accomplished first at the same point and then progressively across the width of the joint in both directions. Here the electrodes 4 are clamped in pairs on opposite faces of each plate and at a distance back from the take-up line equal to the thickness of the plate.

The amount of take-up, that is the actual movement of one of the parts toward the other, being determined in advance, the electrode should be set so far back from the edge that they will not engage the burr formed by the extruded metal. Such an engagement flattens the burr, produces a sharp angular bend of any fibers of slag or other material in the metal and finally chills the burr and causes cracks which pass into the metal beyond the portion of the burr which is to be removed.

The invention applies not only to operations in which the edges of the pieces make contact progressively across the joint but also to cases in which the contacting faces engage each other initially across their full width.

Though we have described with great particularity of detail certain processes embodying our invention, yet it is not to be understood therefrom that the invention is restricted to the particular steps described. Various modifications in detail may be made by those skilled in the art without departure from the invention as defined in the following claims.

What we claim is:

1. In electric welding, the method which consists in applying the electrode to the part to be welded so far from the edge of the latter as to secure a sufficiently even distribution of current to make a good weld throughout the width of the joint, and no farther, so as to heat as short a length of metal as possible with such distribution of the current, pressing the parts together, and while maintaining such pressure, passing a current of extremely high amperage for a very short period of time throughout the width of the joint.

2. In electric welding, the method which consists in applying the electrode to the part to be welded at a distance from its edge between the maximum approximately equal to the take-up plus twice the thickness of said part and a minimum equal to or slightly greater than the take-up, and passing a current of extremely high amperage for a very short period of time.

3. In electrically welding the long thin edges of segments to form hollow objects, the method which consists in applying each of the electrodes to the outer face of a segment so far from the edge of the latter as to secure a sufficiently even distribution of current to make a good weld throughout the width of the joint, and no farther, so as to heat as short a length of metal as possible with such distribution of the current, pressing the parts together and, while maintaining such pressure, passing a current of extremely high amperage for a very short period of time.

4. In electrically welding the long thin edges of segments to form hollow objects, the method which consists in shaping such segments with their edges designed to make contact at points in their width remote from their outer faces and applying an electrode to the outer face of each segment so far from the edge of the latter as to secure a sufficiently even distribution of current to make a good weld throughout the width of the joint, and no farther, so as to heat as short a length of metal as possible with such distribution of the current, pressing the parts together and, while maintaining such pressure passing a current of extremely high amperage for a very short period of time.

In witness whereof, we have hereunto signed our names.

JOSEPH B. MURRAY.
THOMAS E. MURRAY, Jr.